(12) United States Patent
Mitcheltree

(10) Patent No.: US 10,603,767 B2
(45) Date of Patent: Mar. 31, 2020

(54) POSITIVE STOP RATCHET MECHANISM

(71) Applicant: Matco Tools Corporation, Stow, OH (US)

(72) Inventor: Jeff Mitcheltree, Cuyahoga Falls, OH (US)

(73) Assignee: Matco Tools Corporation, Stow, OH (US)

( * ) Notice: Subject to any disclaimer, the term of this patent is extended or adjusted under 35 U.S.C. 154(b) by 152 days.

(21) Appl. No.: 15/628,800

(22) Filed: Jun. 21, 2017

(65) Prior Publication Data

US 2017/0361430 A1    Dec. 21, 2017

Related U.S. Application Data

(60) Provisional application No. 62/352,833, filed on Jun. 21, 2016.

(51) Int. Cl.
| | |
|---|---|
| *B25B 13/46* | (2006.01) |
| *B25B 13/42* | (2006.01) |
| *F16D 41/12* | (2006.01) |
| *B25B 15/04* | (2006.01) |

(52) U.S. Cl.
CPC ........... *B25B 13/468* (2013.01); *B25B 13/42* (2013.01); *B25B 13/463* (2013.01); *B25B 13/467* (2013.01); *F16D 41/12* (2013.01); *B25B 15/04* (2013.01)

(58) Field of Classification Search
CPC ..... B25B 13/468; B25B 13/42; B25B 13/463; B25B 13/467; B25B 15/04; B25B 13/46; F16D 41/12
See application file for complete search history.

(56) References Cited

U.S. PATENT DOCUMENTS

| | | | | |
|---|---|---|---|---|
| 5,794,496 A | * | 8/1998 | Arnold ................. | B25B 13/463 81/177.8 |
| 2002/0170393 A1 | * | 11/2002 | Yuan-Chin ........... | B25B 13/463 81/58.5 |
| 2003/0177871 A1 | * | 9/2003 | Arnold ................. | B25B 13/463 81/63.2 |
| 2005/0051002 A1 | * | 3/2005 | Brun .................... | B25B 13/463 81/57.39 |
| 2006/0191382 A1 | * | 8/2006 | Pettit ................... | B25B 13/461 81/60 |
| 2011/0162488 A1 | * | 7/2011 | Chan ................... | B25B 13/463 81/63 |
| 2013/0213190 A1 | * | 8/2013 | Chen .................... | B25B 1/02 81/63.2 |
| 2017/0209988 A1 | * | 7/2017 | Liu ...................... | B25B 13/463 |

* cited by examiner

*Primary Examiner* — Robert J Scruggs
(74) *Attorney, Agent, or Firm* — Hahn Loeser & Parks LLP

(57) ABSTRACT

Examples of the present disclosure relate to ratchets and include ratchets having a positive stop ratchet mechanism which controls the movement of a pawl and/or pusher with various geometric configurations and using various materials.

19 Claims, 5 Drawing Sheets

POSITIVE STOP RATCHET MECHANISM

CROSS-REFERENCE TO RELATED APPLICATIONS

This application claims priority to, and the benefit of, U.S. Provisional Application No. 62/352,833 filed on Jun. 21, 2016 with the U.S. Patent Office, which is hereby incorporated by reference.

BACKGROUND OF THE INVENTION

Field of the Invention

The present disclosure relates generally to ratchets, and more particularly, to a positive stop ratchet mechanism for controlling pawl position in a ratchet wrench.

Description of Related Art

The present disclosure relates to ratchet wrenches. Ratchet wrenches typically embody a handle portion and a head portion, wherein the head portion houses a ratchet mechanism capable of rotating about an axis. A ratchet may be manually operated or motor driven. In a motor driven ratchet, a motor may be positioned in the handle portion to operate the ratchet mechanism.

A ratchet drive may be positioned within the head portion of the ratchet and includes a drive body onto which sockets may be engaged or attached. The drive body may be a square drive or formed of any geometric configuration for receiving or engaging the socket. The ratchet drive may further include a gear capable of reciprocating within the head portion in response to the manual or motor driven operation of the ratchet. The drive body is formed on or attached to the gear. The gear may comprise outwardly facing gear cogs, teeth, serrations, other engagement portions, herein referred to generally as gear teeth. Additionally, the ratchet mechanism may include one or more pawls positioned within the head and capable of engaging the gear teeth and driving the gear.

To engage the pawl with the gear teeth a pusher and spring may be driven to and from the pawl by a lever. In current designs, the pusher moves across a face of the pawl and the position of the pawl is maintained by the pusher. However, a pusher may become disengaged from the face of the pawl, overextend, and become lodged between the pawl and the inside of the ratchet head. When this occurs, the pawl and the ratchet drive are no longer functional. Therefore, an improved ratchet design is needed to prevent the pusher from disengaging and becoming lodged between the pawl and the inside of the head portion.

FIG. 1 illustrates a prior art lever bore 1130 associated with a ratchet wrench. Specifically, the prior art lever bore 1130 has curved sidewalls 1150, formed by the circumference of a cylindrical bore and sometimes referred to as sidewalls having a crescent moon shape. The curved sidewalls 1150 can result in the problem of the pusher disengaging and becoming lodged as noted, making the ratchet non-functional.

SUMMARY OF THE INVENTION

Particular examples of the present invention include a positive stop ratchet mechanism to prevent the pusher from disengaging from the pawl surface. In various examples, a positive stop ratchet mechanism controls the movement of a pawl and/or pusher with various geometric configurations and using various materials.

In an example of the present invention a ratchet wrench comprises a head portion. The head portion has a back side and a front side with a head cavity formed therein. The head cavity includes a gear cavity, a pawl cavity and a lever bore. A gear having gear teeth and a drive body is rotatably engaged with the gear cavity wherein the drive body extends outwardly from the front side of the head portion for engaging and rotation a workpiece. A pawl having pawl teeth is movable engaged within the pawl cavity. The pawl teeth are positioned to engage and disengage the gear teeth. A lever having a lever body is positioned within the lever bore wherein the lever body is movable from at least a first position to a section position by a lever handle. An actuator, for biasing a face of the pawl opposite the pawl teeth, engages the lever body of the lever. The lever body includes one or more register surfaces for contacting one or more sidewalls of the lever bore having opposing flat sections as it is moved from the first position to the second position. In some examples of the present invention, the one or more register surfaces of the lever body are also flat.

The foregoing and other examples, objects, features, and advantages of the invention will be apparent from the following more detailed descriptions of particular examples of the invention, as illustrated in the accompanying drawings wherein like reference numbers represent like parts of the invention.

DETAILED DESCRIPTION OF THE DRAWINGS

DETAILED DESCRIPTION OF PARTICULAR EXAMPLES

Figure 1:
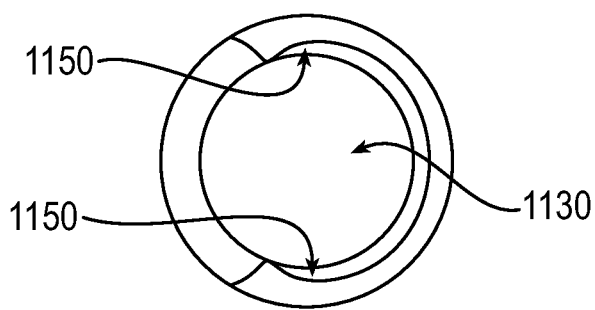
FIG. 1 is a bottom view of a prior art lever bore associated with a ratchet wrench.

The present invention relates to a ratchet wrench or tool including a positive stop mechanism. In an aspect, the present invention includes a lever bore which limits the range of motion of a ratchet mechanism. In examples of the present invention, the lever bore comprises at least two opposite facing flat sections which engage register surfaces of the lever body for maintaining the position of the lever body. By maintaining the position of the lever body, the range of motion of some or all of the remaining components of the ratchet mechanism are additionally limited, as discussed in the various examples described below. As such, the details of the present invention will be discussed in greater detail below with the figures illustrating various examples of the invention.

The present invention includes examples of a positive stop mechanism for a ratchet wrench. In examples, a ratchet wrench comprises a head portion. The head portion may be integrally formed in a ratchet body or mechanically connected to a ratchet body. Mechanical connections may include, by example, an additional ratchet assembly, a hinge connection, a pivotal connection, rotatable connection, a rigid connection or any other suitable connection. In some examples, the head portion may be used independently of a ratchet body and in combination with other tools such as an impact wrench or drill, for example. The ratchet body may further comprising a ratchet handle for the manual operation of the ratchet. Additionally or alternatively, the ratchet body may comprise a motor for automatically driving the ratchet mechanism.

The head portion includes a back side and a front side. In some examples, when the ratchet wrench is in use, the back side of the ratchet wrench is oriented opposite side the workpiece to be driven (herein referred to as the "workpiece"). Examples of a workpiece include a socket, a fastener, a bolt, drill bit or the like. In these examples of the ratchet wrench, the front side of the ratchet wrench is oriented such that it is facing the workpiece and the workpiece is inserted into or engages the ratchet wrench at the front side. Formed in the front side of the head portion is at least a portion of the head cavity. The head cavity is configured to receive and house the ratchet mechanism within the head portion. The head cavity may be machined or cast into the head portion, or formed in another suitable manner.

In particular examples, the head cavity includes a gear cavity, a pawl cavity and a lever bore. Each of these cavities or bores may be machined or cast into the head portion, or formed by a combination of both or in another suitable manner. The gear cavity is substantially open to the front side of the head portion and receives a gear, with gear teeth. As described herein, gear teeth may include gear cogs, serrations or other engagement portions. The gear also includes a drive body. In various examples, the gear is a cylinder wherein the gear teeth are formed on at least a portion of the lateral surface extending at least over a portion of the circumference of the cylinder. Likewise, the gear cavity may be a cylindrical bore for receiving the cylindrical gear. The drive body is either formed integrally into an end surface or attached and extending from an end surface of the cylinder. In one particular example, the drive body is centrally formed on an end surface of the cylindrical gear and is centrally positioned on that end surface, relative to an axis from which the radius of the cylinder extends. Whether integrally formed into the gear or attached and extending from the gear, the drive body engages, by gripping and/or biasing, the piece to be driven. The drive body may be integral with the gear or attached to the gear, such as by a mechanical connection.

In examples of the present invention, the gear rotates within the gear cavity. To rotate the gear, a pawl having pawl teeth engages the gear teeth. The pawl teeth may include pawl cogs, serrations or other suitable engagement portions. The pawl teeth of the pawl are shaped to engage the gear teeth in order to rotate the gear in combination with the rotation of the head portion when rotated in the driving direction. The pawl teeth are also shaped to disengage the gear teeth to allow the gear to rotate freely within and relative to the gear cavity when the head portion is rotated opposite the driving direction. By example, in a first configuration, the engagement of the pawl forces the gear to rotate with the head portion in the clockwise direction relative to the workpiece and the disengagement of the pawl allows the gear to rotate freely within the gear cavity when the head portion is rotated in the counter-clockwise direction relative to the workpiece. In a second configuration the engagement of the pawl may forces the gear to rotate with the head portion in the counter-clockwise direction relative to the workpiece and the disengagement of the pawl allows the gear to rotate freely within the gear cavity when the head portion is rotated in the clockwise direction relative to the workpiece. Further, a third configuration may also be provided. In a third configuration the pawl may force the gear to rotate with the head portion or rotate freely in both the clockwise and counter-clockwise direction, relative to the workpiece. Further yet, in various other configurations the pawl may engage and/or disengage the gear teeth to transition between each of the first through third configurations or between various combinations of the first through third configurations.

In examples of the present invention, a lever is provided to control the engagement and/or disengagement between the pawl teeth of the pawl and the gear teeth of the gear. In one particular example the lever is positioned within the head cavity in the lever bore of the head cavity. In various examples, the lever bore forms an aperture in the back side of the head portion. Thereby, the lever may extend through the aperture in the back side of the head portion. In some examples, the lever may alternatively or additionally extend through an aperture in an end of the head portion and/or the front of the head portion. In the example wherein the lever extends through an aperture in the back side of the head portion, a lever handle of the lever is positioned to the exterior of the head portion at the back side of the head portion while a lever body extends into the lever bore of the head portion. The lever handle may be integral with the lever body or independent of, and attached to, the lever body. By moving the lever handle at least a portion of the lever body rotates and/or moves within the lever bore of the head cavity.

In some examples of the present invention, an actuator biases a face of the pawl, opposite the pawl teeth, and the pawl is controlled via the lever. By example, the actuator may also engage a lever body of a lever within the lever bore wherein the lever body is movable from a first position to a second position by a lever handle. By engaging the actuator, the movement of the lever controls or initiates movement of the pawl. An actuator may be any mechanical, electrical or other suitable connection between the lever and the pawl. An example of an actuator is a pusher and a spring that are movably connected to the lever body and a pawl such that the pusher and the spring are positioned between the lever body and the pawl. In one particular example, the pusher and the spring are positioned between the lever body and the pawl and are in compression between the lever body and the pawl. In one variation, the pusher is in contact with the pawl and the spring is in contact with the lever body and the pusher. It should be recognized that the pusher may be in contact with the lever body and/or the spring may be in contact with the pawl without departing from the present invention. Likewise, it is also appreciated the spring may be integral to the pusher wherein the pusher (or multiple pushers separated by a spring) may be in contact with both the pawl and the lever body. In other examples, a spring may be utilized without a pusher. In operation, the pusher moves from a position proximal to the first end of the pawl to a position proximal to the second end of the pawl, as forced by the movement or rotation of the lever. A seating portion (i.e., a groove, shelf, etc.) may be formed in the face of the pawl such that the pusher moves and/or slides in the seating portion. Additionally, the seating portion may include ledges or the like positioned at one or more of the ends of the pawl to prevent the pusher from extending past the ends of the pawl. The face of the pawl may be formed of any shape or combination of shapes, include linear, concave, convex, etc., for example.

In particular examples, the pawl may be positioned within a pawl cavity of the head cavity. The pawl cavity may have the same or similar geometry as a lever bore. The pawl cavity may also be an extension of the geometry of the lever bore. By example, one or more sidewalls of the pawl cavity may be contiguous with one or more sidewalls of the lever bore. In an example, one or more sidewalls of the lever bore have two parallel opposite facing flat sections, and the one or more sidewalls of the pawl cavity may also have two parallel opposite facing flat sections. In an alternative example, even if the one or more sidewalls of the lever bore does not have two parallel opposite facing flat sections, the pawl cavity may have one or more sidewalls having two parallel opposite facing flat sections, or vice versa. Additionally and alternatively, the pawl cavity may be an extension of the geometry of the gear cavity. In one example, the pawl, positioned within the pawl cavity, includes a first end proximal a first sidewall of the pawl cavity and a second end proximal a second sidewall of the pawl cavity such that the first sidewall of the pawl cavity is positioned on an angle that is obtuse relative to the second sidewall of the pawl cavity.

In operation, when the lever is moved or rotated to force the pusher into the position proximal the first end of the pawl, the pawl moves within the pawl cavity in the direction of the first end of the pawl. The movement of the pawl is limited by a first positive stop position. In the driving direction, the pawl teeth engage the gear teeth thereby moving the gear with the head portion. In the opposite/reverse direction, the pawl substantially maintains it position in the first positive stop position while the pawl teeth and the gear teeth freely move over one another to allow the gear to rotate within the gear cavity formed in the head portion. When the lever is moved or rotated to force the pusher into the position proximal the second end of the pawl, the pawl moves within the pawl cavity in the direction of the second end of the pawl. The movement of the pawl is limited by a second positive stop position. The driving direction has now changed. In the new driving direction, the pawl teeth engage the gear teeth thereby moving the gear in combination with the head portion in this new direction. Similarly, the freely moving reverse direction has additionally changed. In the new reverse direction, the pawl substantially maintains its position in the second stop position while the pawl teeth and the gear freely move over one another to allow the gear to rotate within the gear cavity formed within the head portion. Some examples may additionally include a third positive stop position wherein the pusher contacts the center of the face of the pawl, between the first end of the pawl and the second end of the pawl. In this position, the pawl teeth are constantly engaged with the gear teeth forcing the gear to move with the head portion in both rotational directions. Some examples may also include a positive stop position wherein the pawl teeth are completely disengaged from the gear teeth, allowing the gear to freely rotate within the gear cavity formed in the head portion.

In the prior art, the lever bore of the head cavity is formed with curved sidewalls as shown in FIG. 1. By example, the lever bore of the prior art is a cylindrical bore extending at least partially between the back side and the front side of the head portion. In other variations of the prior art, the lever bore has sidewalls formed of a crescent moon geometry. This allows the lever body to move and/or rotate freely about its longitudinal axis, wherein the longitudinal axis is an imaginary line extending through the lever from the back side of the head portion to the front side of the head portion. The problem with this freedom of movement is that the pusher and/or the spring may become disengaged from the pawl and/or the lever as a result of overextension, resulting in the ratchet drive being no longer functional.

In examples of the present invention, the lever body is shaped to engage and contact the geometry of the lever bore in a positive stop position. Upon making contact, the range of motion and/or rotation of the lever body is positively limited or stopped. In various examples, to provide adequate contact between the lever body and the geometry of the lever bore, a register surface on the lever body mates with one or more register surfaces formed in the sidewalls of the lever bore, which may be configured as flat sidewalls. In various examples the register surfaces on the lever body are also flat surfaces. In some examples, at least 80% of the surface area of register surface of the lever body contacts a sidewall of the lever bore at a positive stop position. In other examples, as little as 50% of the surface area of the register surface of the lever body contacts a sidewall of the lever bore at a positive stop position. Yet, in other examples, as much as 100% of the surface area of the register surface of the lever body contacts a sidewall of the lever bore at a positive stop position. In some examples, the amount of contact between the lever and a sidewall of the lever bore may be indicated by a percentage of lever perimeter which contacts one or more register surfaces formed in the sidewall of the lever bore. In one such example, 10% of the lever perimeter (including a deviation of +/−1%) contacts one or more register surfaces formed in the sidewalls of the lever bore. More than one positive stop position may be provided. By example, a first positive stop position may be provided between a first sidewall of the lever bore and a first register surface of the lever body and a second positive stop position may be provided between a second sidewall of the lever body and a second register surface of the lever body. In another example, multiple positive stop positions may be provided having either one flat sidewall or one register surface of the lever body. In an example of this variation, a first register surface of the lever body may mate with the single flat sidewall in a first positive stop position and a second register surface of the lever bore may mate with the single flat sidewall in the second positive stop position. In an alternative example of this variation, a single register surface of the lever body may mate with a first flat sidewall in a first positive stop portion and a second flat sidewall in a second positive stop position. It is appreciated that not all the sidewalls may be flat, thereby, one or more additional sidewalls may be curved and/or portions of a flat sidewall may be curved. Similarly, it is appreciated that not all of the register surfaces of the lever body are flat. Likewise, one or more additional surfaces of the lever body may be curved and/or portions of a the register surfaces of the lever body may be curved.

In one particular example of the present invention, the lever bore comprises two or more sidewalls having at least two opposing spaced apart flat sidewalls that may be substantially parallel. In a first positive stop position, a first register surface of the lever body engages and/or contacts one of the two opposing spaced apart flat sidewalls. In a second positive stop position, a second register surface of the lever body engages and/or contacts the other of the opposing spaced apart flat sidewalls. As described above, a variation of this example may comprise of a single register surface of the lever body for engaging both flat sidewalls in the first positive stop position and the second positive stop position, respectively. In some examples, flat sidewalls may extend into other portions of the head cavity, including the pawl cavity.

The lever bore may be integrally formed in the head cavity. The lever bore may also be formed within an insert which is inserted and seated into the head cavity. For example, a lever bore formed in an insert may allow modification of a prior art ratchet wrench design described above, by retrofitting the wrench with this invention. The modification is facilitated by either boring out an existing bore and/or inserting the lever bore formed in an insert into the existing cavity or bored out cavity. This ability to retrofit existing ratchets provides for efficient repair to existing ratchet wrench designs, where the pusher is prone to over-extension and/or separating from the pawn.

In various examples, the positive stop mechanism prevents the pawl from contacting sidewalls of the head cavity and, in particular, sidewalls of the pawl cavity, by limiting the range of motion of the pawl. The range of motion of the pawl may be so limited that a void is constantly maintained between the pawl and each sidewall of the pawl cavity. This eliminates wear on the pawl and also prevents the pawl from binding between the sidewall and the gear teeth. Additionally, this prevents the pawl from extending away from the lever body about the diameter of the gear and causing the pusher and/or spring to disengage from the pawl and/or lever body. In other words, by preventing pawl from extending away from the lever body, the spring maintains sufficient compression to keep the spring, pawl, pusher and lever body in constant operative engagement, regardless of the orientation.

In a variation of the present invention, a positive stop mechanism may be provided at the exterior of the head portion. By example, the sidewalls may be formed into the back side of the head portion. The lever handle of the lever may contact and engage the sidewalls formed into the back side of the head portion in the same manner the register surface of the lever body contacts the sidewalls of the lever bore. This may be used in addition to or as an alternative to the examples described above.

In some examples, the lever may be formed of heat treated material, such as alloy steel. This may include the entire lever or portions of the lever including the lever body. The heat treated portion of the lever body may be limited to the portion forming the register surface. By heat treating at least the register surface, this portion of the lever body is hardened and become more resistant to wear and/or deformation upon contacting the sidewall of the head portion. Similar to providing more surface area of contact, the heat treated material additionally increases the longevity of the lever and maintains the lever within the specified tolerances. In one particular example, at least a portion of the alloy steel of the lever is heat treated to within a range of 37-43 HRC (hardness Rockwell "C" scale).

The particular examples discussed above will now be described in further detail below in association with the figures filed herewith exemplifying the invention in association with these particular examples. Variations to these particular examples are within the scope of the invention.

Figure 2:
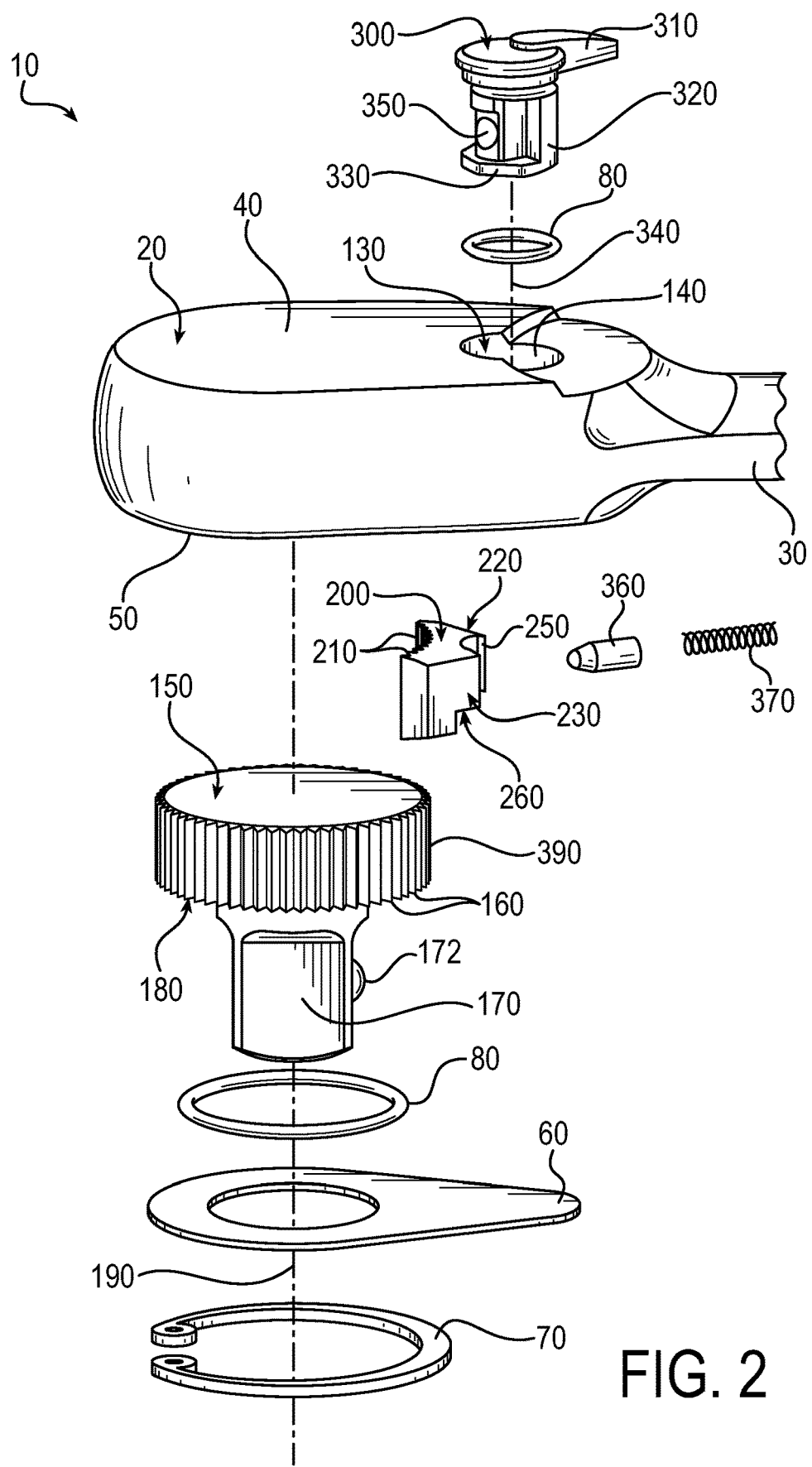
FIG. 2 is a partial exploded perspective view of a ratchet wrench, according to an example of the present invention.

With reference to FIG. 2, a partial exploded view of a ratchet wrench 10 is illustrated. The ratchet wrench 10 includes a head portion 20 and a ratchet handle 30. The head portion 20 has a back side 40 and a front side 50. An aperture 140 is formed through the back side 40 of the head portion 20. The aperture 140 opens into a lever bore 130 of the head cavity. A lever 300 having a lever handle 310 and a lever body 320 is positioned in the lever bore 130 through the aperture 140. In this particular example, the lever 300 has a lever register surface 330 and rotates about the lever longitudinal axis 340. A spring seat 350 is illustrated in the face of the lever for receiving a spring 370 and/or a pusher 360. One or more O-rings 80 may be used as a mechanical gasket between ratchet wrench 10 components, as illustrated to the base of the lever 300.

Figure 4:
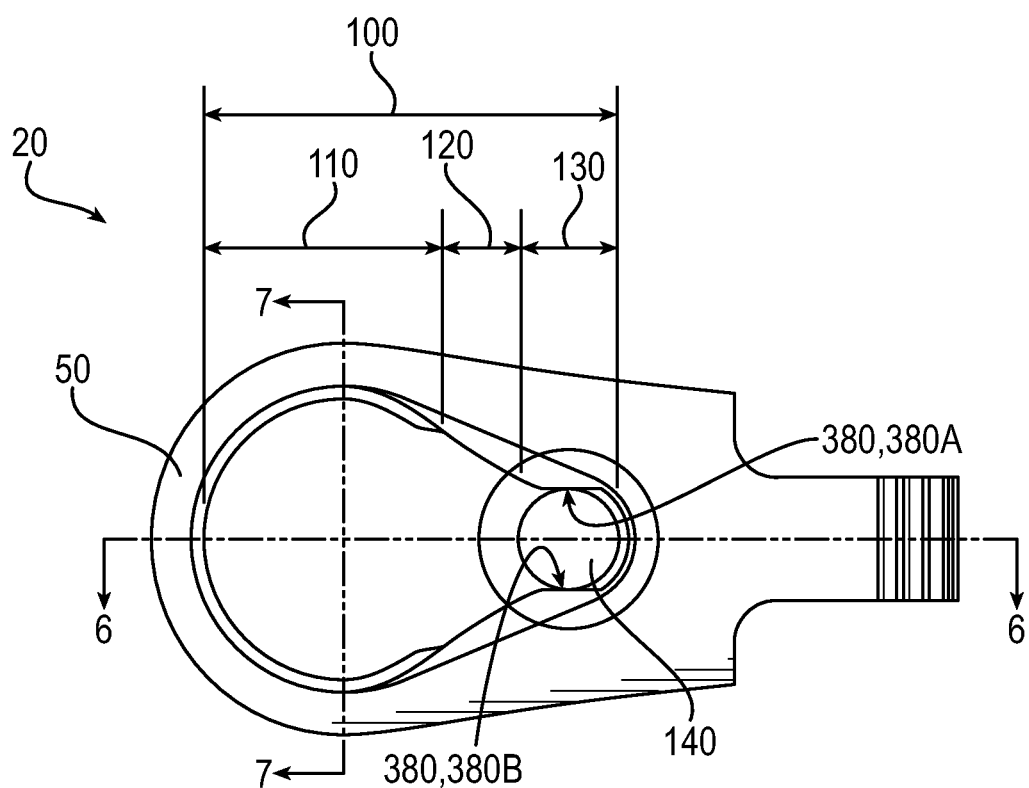
FIG. 4 is a view of the front side of the head portion of the example ratchet wrench of FIG. 2.

Still referring to FIG. 2, the spring 370 and the pusher 360 are positioned between the lever body 320 and the face 250 of a pawl 200 positioned within a pawl cavity 120 (see FIG. 4). In this particular example, the face 250 of the pawl 200 is concave with pawl ledges 260 formed at the first end 220 and the second end 230 of the pawl, respectively. Formed on the pawl surface, located opposite of the face 250 of the pawl 200, are one or more pawl teeth 210. The pawl teeth 210 are formed to mate with gear teeth 160 of a gear 150. In this particular example, the gear teeth 160 are formed on the lateral surface 390 extending the circumference of the gear. The gear 150 rotates about the gear axis 190. A drive body 170 extends from an end surface of the gear 150. A socket engaging member or ball 172 is movably mounted on the drive body 170 to provide a socket retention and quick release mechanism, wherein the ball 172 is released from the socket to unlock the socket from the drive body. A cover plate 60 is secured to the front side 50 of the head portion by a retainer 70 and example of which may be a snap ring. Again, an O-ring 80 is illustrated between the cover plate 60 and the gear 150 as a mechanical gasket.

Figure 3:
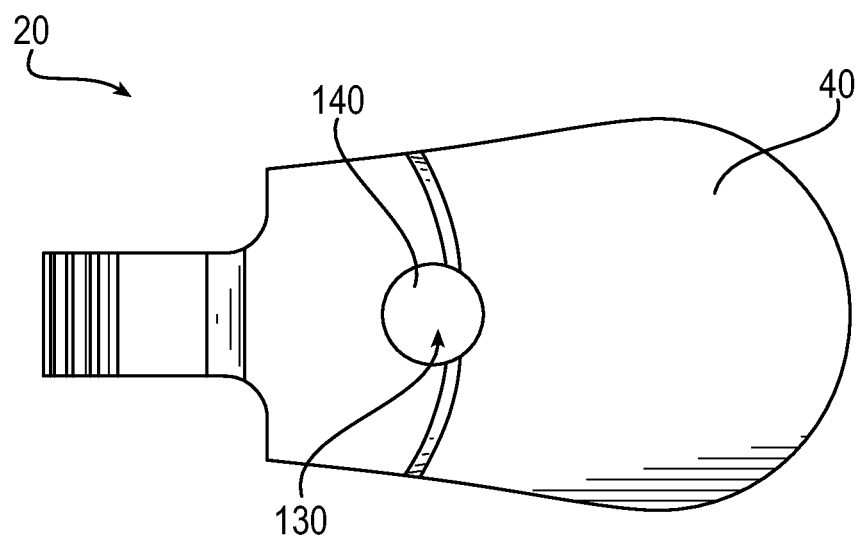
FIG. 3 is a view of the back side of the head portion of the example ratchet wrench of FIG. 2.
Figure 5:
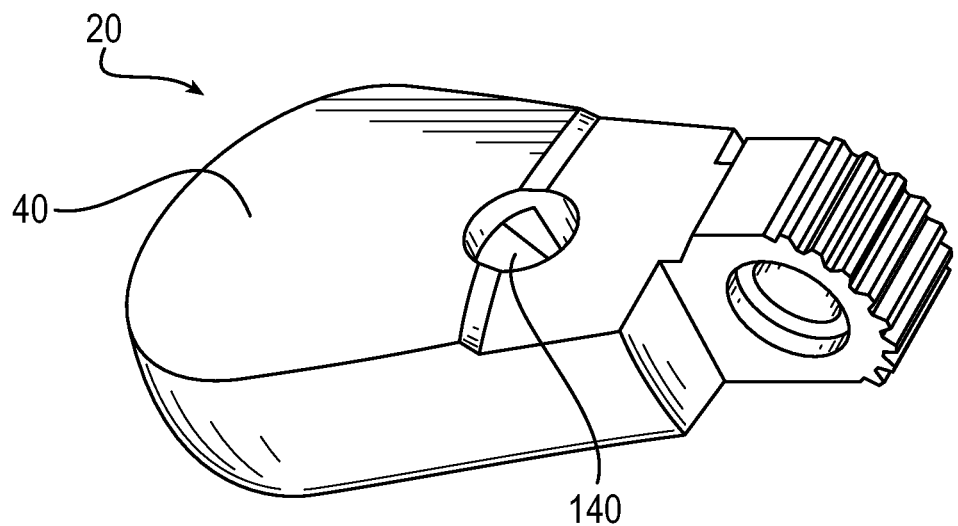
FIG. 5 is a perspective view of the head portion of the example ratchet wrench of FIG. 2.

Turning to FIGS. 3 and 5, the back side 40 of a head portion 20 is illustrated. In this particular example, the head portion 20 is separate from and may be mechanically attached to a ratchet handle 30 (see FIG. 2). An aperture 140 is open through the back side 40 of the head portion into the lever bore 130. FIG. 4 illustrates the front side 50 of the head portion 20. A head cavity 100 is formed in the head portion 20 from the front side 50. The head cavity 100 comprises a gear cavity 110, a pawl cavity 120 and the lever bore 130 with the aperture 140 extending through the back side of the head portion 20. Sidewalls 380 are formed within the lever bore 130. In particular, two opposing flat sidewalls 380, which may be substantially parallel, are illustrated as a first sidewall 380A and a second sidewall 380B (see FIG. 9).

Figure 6:
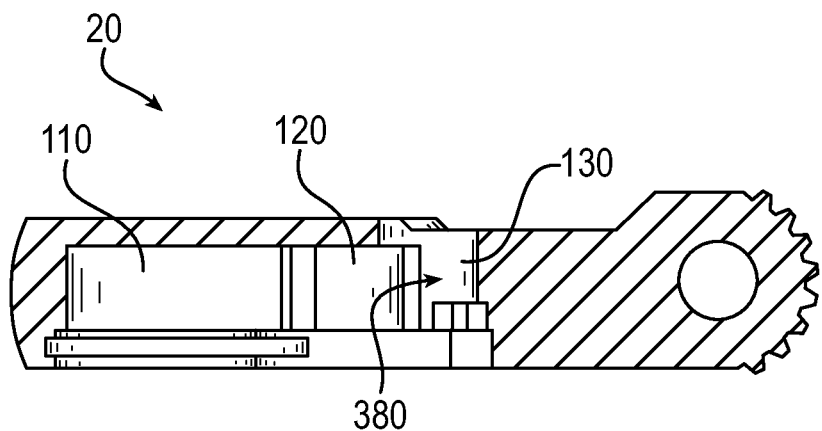
FIG. 6 is a cross-section of a head portion of the example ratchet wrench taken at line 6-6 of FIG. 4.
Figure 7:
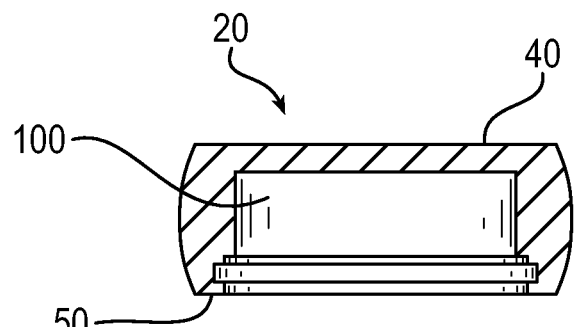
FIG. 7 is a cross-section of a head portion of the example ratchet wrench taken at line 7-7 of FIG. 4.

FIGS. 6 and 7 are cross-sectional views of the head portion 20. FIG. 6 provides a cross-section of the head portion 20, as taken at line 6-6 of FIG. 4. The gear cavity 110, pawl cavity 120 and the lever bore 130 forming the head cavity are illustrated. Within the lever bore 130 are the one or more sidewalls 380. FIG. 7 provides a cross-section of the head portion 20, as taken at line 7-7 of FIG. 4. The back side 40 and the front side 50 of the head portion 20 are illustrated with the head cavity 100 formed therein.

Figure 8:
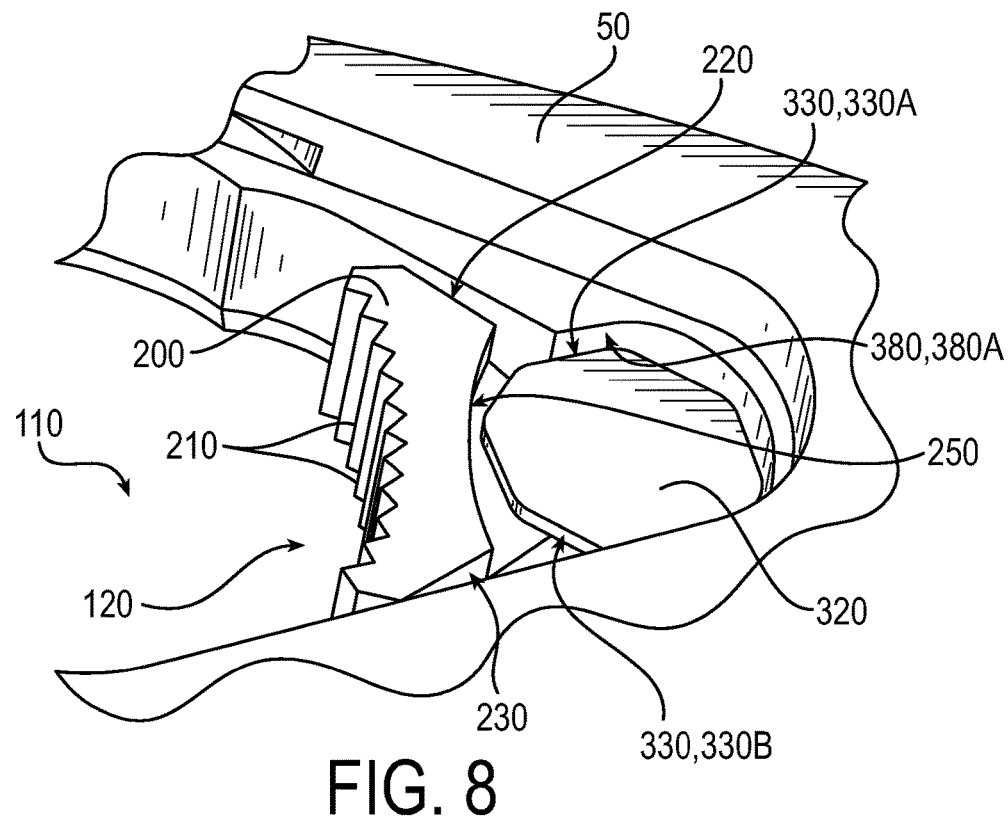
FIG. 8 is a partial perspective view of the front side of a head cavity with a pawl and lever body in the example of the ratchet wrench of FIG. 2.

FIG. 8 provides a partial perspective view of the head cavity 100 within the front side 50 of the head portion 20. For illustrative purposes, the gear is not shown in this view but would be positioned within the gear cavity 110. Positioned within the lever bore 130 is a lever with the lever body 320 shown. The lever body 320 having register surfaces 330 including at least a first register surface 330A and an opposing second register surface 330B. In its current orientation, the lever is turned such that the first register surface 330A is engaged with and contacting a flat face the first sidewall 380A of the lever bore 130. The second register surface 330B is also illustrated in the figure and is rotated away from a second sidewall 380B of the lever bore 130. When in this position the pawl 200 is driven in the direction of the first end 220 for the pawl teeth 210 to engage the gear teeth 160. In one particular example, a void is maintained between the first end 220 of the pawl 200 and the adjacent side of the pawl cavity 120 based upon the contact between the first register surface 330A and the first sidewall 380A. When the pawl 200 is driven in the direction of the first end 220 of the pawl 200, the second end 230 of the pawl 200 is moved away from the adjacent side of the pawl cavity 120. The pawl 200 is oppositely positioned within the pawl cavity 120 when the pawl 200 is driven in the direction of the second end 230 of the pawl 200 by the lever 300. The pawl 200 is driven by the lever 300 with the pusher and the spring positioned between the lever body 320 and the face 250 of the pawl 200.

Figure 9:
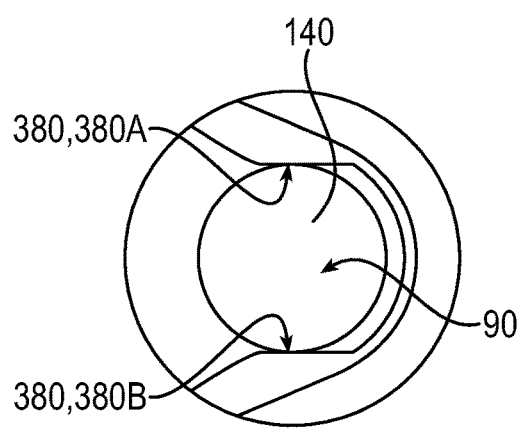
FIG. 9 is a bottom view of a lever bore in the example of the ratchet wrench of FIG. 2.
Figure 10:
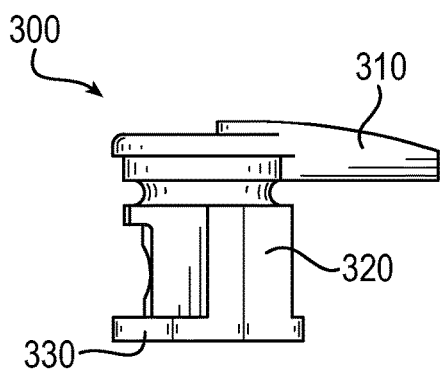
FIG. 10 is a side view of a lever in the example of the ratchet wrench of FIG. 2.

FIG. 9 illustrates one particular example of the lever bore 130 of present invention wherein two parallel opposite facing flat sidewalls 380 are illustrated as a first sidewall 380A and a second sidewall 380B. The aperture 140 is illustrated extending through the back side of the head portion. As indicated above, the two parallel opposite facing flat sidewalls 380 serve as a positive stop ratchet mechanism by providing significant contact between the surface of the sidewall and the register surface 330 of a lever body. The lever 300 having a lever handle 310 and lever body 320 is illustrated by FIG. 10. The lever body 320 further comprises the register surface 330. Corresponding to the movement of the lever and the engagement with the sidewalls 380 of the lever bore 130, the movement of the spring, the pusher and the pawl are more efficiently controlled.

The terms "comprising," "including," and "having," as used in the claims and specifications herein, shall be considered as indicating an open group that may include other elements not specified. The terms "a," "an," and the singular forms of words shall be taken to include the plural form of the same words, such that the terms mean that one or more of something is provided. The terms "at least one" and "one or more" are used interchangeably. The term "single" shall be used to indicate that one and only one of something is intended. Similarly, other specific integer values, such as "two," are used when a specific number of things is intended. The terms "preferably," "preferred," "prefer," "optionally," "may," and similar terms are used to indicate that an item, condition or step being referred to is an optional (i.e., not required) feature of the invention.

While this invention has been described with reference to particular examples thereof, it shall be understood that such description is by way of illustration only and should not be construed as limiting the scope of the claimed invention. Accordingly, the scope and content of the invention are to be defined only by the terms of the following claims. Furthermore, it is understood that the features of any specific example discussed herein may be combined with one or more features of any one or more examples otherwise discussed or contemplated herein unless otherwise noted.

What is claimed is:

1. A ratchet wrench comprising:
a head portion having a back side and a front side with a head cavity formed therein wherein the head cavity includes a gear cavity, a pawl cavity, and a lever bore;
a gear having gear teeth and a drive body, the gear rotatably engaged within the gear cavity wherein the drive body extends outwardly from the front side of the head portion for engaging and rotating a workpiece;
a pawl having pawl teeth which is moveably engaged within the pawl cavity wherein the pawl teeth are positioned to engage and disengage the gear teeth;
an actuator for biasing a face of the pawl opposite the pawl teeth where the actuator engages a lever body of a lever within the lever bore and the lever body is moveable from at least a first position to a second position by a lever handle that is perpendicular to a longitudinal axis of the lever body and is offset from a ratchet handle; and
the lever body having a first register surface and a second register surface rotatable within the lever bore about the longitudinal axis of the lever body from a first position to a second position where the first register surface contacts a first sidewall of the lever bore in the first position as the second register surface is separated from the second sidewall and where the second register surface contacts a second sidewall of the lever bore in the second position as the first register surface is separated from the first sidewall and the first sidewall and the second sidewall are parallel in a direction extending a length of the head cavity bisecting the gear cavity, the pawl cavity, and the lever bore.

2. The ratchet wrench of claim 1 wherein the first and second register surfaces of the lever body are flat.

3. The ratchet wrench of claim 1 wherein at least 50 percent of a surface of the first and second register surfaces contact the first and second sidewalls of the lever bore.

4. The ratchet wrench of claim 1 wherein 80 percent or more of a surface of the first and second register surfaces contact the first and second sidewalls of the lever bore.

5. The ratchet wrench of claim 1 wherein the pawl includes a first end proximal a first sidewall of the pawl cavity and a second end proximal a second sidewall of the pawl cavity such that the first sidewall of the pawl cavity is positioned at an angle that is obtuse relative to the second sidewall of the pawl cavity and the pawl does not contact a sidewall of the pawl cavity and a void is constantly maintained between the pawl and the sidewall of the pawl cavity.

6. The ratchet wrench of claim 1 wherein the pawl does not contact a sidewall of the pawl cavity and a void is constantly maintained between the pawl and the sidewall of the pawl cavity.

7. The ratchet wrench of claim 1 wherein the actuator is a pusher biased into engagement with the pawl, and the pawl includes a first pawl ledge formed on the face of the pawl at a first end of the pawl and a second pawl ledge formed on the face of the pawl at a second end of the pawl such that the pusher is maintained between the first pawl ledge and the second pawl ledge on the face of the pawl.

8. The ratchet wrench of claim 7 wherein the pusher is biased by a spring which is in a constant state of compression.

9. The ratchet wrench of claim 1 wherein the one or more sidewalls of the pawl cavity are a first sidewall and a second sidewall of the pawl cavity and are contiguous with the first and second sidewalls of the lever bore and are also parallel in a direction extending the length of the head cavity.

10. The ratchet wrench of claim 9 wherein the first and second sidewalls of the pawl cavity have opposite facing flat sections.

11. The ratchet wrench of claim 1 wherein the one or more register surfaces of the lever body are constructed of heat treated alloy steel within a range of 37-43 HRC.

12. The ratchet wrench of claim 1 wherein the lever body is constructed of heat treated alloy steel within a range of 37-43 HRC.

13. The ratchet wrench of claim 1 wherein the one or more sidewalls of the pawl cavity are convex.

14. The ratchet wrench of claim 1 wherein the gear cavity is a cylindrical bore for receiving a cylindrical gear and the cylindrical bore is open to the lever bore through the pawl cavity.

15. The ratchet wrench of claim 1 wherein the entire plane of the first sidewall of the lever bore is parallel to the entire plane of the second sidewall of the lever bore.

16. A lever bore, the lever bore comprising:
   a first sidewall and a second sidewall that are parallel in a direction perpendicular to a longitudinal axis of a lever for contacting a first register surface and a second register surface of a lever body where a lever handle of the lever is perpendicular to the longitudinal axis and is offset from a ratchet handle and where the first and second register surfaces are rotatable within the lever bore about the longitudinal axis of the lever body as the lever body is moved from a first position to a second position where the first register surface contacts a first sidewall of the lever bore in the first position as the second register surface is separated from the second sidewall and where the second register surface contacts a second sidewall of the lever bore in the second position as the first register surface is separated from the first sidewall.

17. The lever bore of claim 16 wherein the entire plane of the first sidewall is parallel to the entire plane of the second sidewall.

18. A head portion of a ratchet wrench, the head portion comprising:
   a head cavity having a gear cavity, a pawl cavity, and a lever bore;
   the lever bore having a first sidewall and a second sidewall that are parallel in a direction extending a length of the head cavity bisecting the gear cavity, the pawl cavity, and the lever bore for contacting one or more register surfaces of a lever body of a lever where the one or more register surfaces are rotatable about the longitudinal axis of the lever body as the lever body is moved from a first position to a second position where only one of the one or more register surfaces contacts only one of the first sidewall or the second sidewall in the first position or in the second position and where a lever handle is perpendicular to the longitudinal axis of the lever body and is offset from a ratchet handle.

19. The lever bore of claim 18 wherein the entire plane of the first sidewall is parallel to the entire plane of the second sidewall.

* * * * *